United States Patent
Nagoshi et al.

(10) Patent No.: US 7,688,489 B2
(45) Date of Patent: Mar. 30, 2010

(54) COLOR PROCESSING APPARATUS AND ITS METHOD, PROGRAM, AND PRINTER DRIVER

(75) Inventors: Shigeyasu Nagoshi, Yokohama (JP); Rie Kajihara, Yokohama (JP); Akihiko Nakatani, Kawasaki (JP); Minako Kato, Kawasahi (JP); Naoki Sumi, Kawasaki (JP); Takashi Nakamura, Yokohama (JP); Makoto Torigoe, Tokyo (JP); Okinori Tsuchiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1154 days.

(21) Appl. No.: 11/227,176

(22) Filed: Sep. 16, 2005

(65) Prior Publication Data

US 2006/0061785 A1 Mar. 23, 2006

(30) Foreign Application Priority Data

Sep. 17, 2004 (JP) .............................. 2004-271011

(51) Int. Cl.
G03F 3/08 (2006.01)
H04N 1/60 (2006.01)
H04N 1/46 (2006.01)
B41J 2/205 (2006.01)
G01D 11/00 (2006.01)

(52) U.S. Cl. ........................ 358/520; 358/1.9; 358/518; 358/525; 347/15; 347/100

(58) Field of Classification Search ........................ None
See application file for complete search history.

(56) References Cited

U.S. PATENT DOCUMENTS

| 6,498,638 | B1 * | 12/2002 | Zolliker et al. ................. 355/32 |
| 7,009,734 | B2 | 3/2006 | Suwa et al. .................... 358/1.9 |
| 7,016,530 | B2 | 3/2006 | Saito et al. .................... 382/162 |
| 7,034,844 | B2 | 4/2006 | Akiyama et al. ............. 345/590 |
| 7,079,152 | B2 | 7/2006 | Akiyama et al. ............. 345/589 |
| 7,450,281 | B2 | 11/2008 | Torigoe et al. |
| 2003/0043394 | A1 * | 3/2003 | Kuwata et al. ................ 358/1.9 |
| 2003/0202194 | A1 | 10/2003 | Torigoe et al. |
| 2003/0202195 | A1 | 10/2003 | Ito ............................. 358/1.9 |

(Continued)

FOREIGN PATENT DOCUMENTS

JP 6-303432 10/1994

(Continued)

*Primary Examiner*—Twyler L Haskins
*Assistant Examiner*—Barbara D Reinier
(74) *Attorney, Agent, or Firm*—Fitzpatrick, Cella, Harper & Scinto

(57) ABSTRACT

The color of magenta using newly developed magenta ink has characteristics $L^* \approx 41$, $a^* \approx 82$, and $b^* \approx 24$, and has differences $\Delta L^* \approx 4$, $\Delta a^* \approx 0$, and $\Delta b^* \approx 26$ from the conventional magenta ink, i.e., the lightness value is low, and the color difference $b^*$ assumes a very small value. When the color of red is reproduced using such new magenta ink, its lightness and saturation values are low, and subdued red is reproduced, i.e., a visually favorable color cannot be obtained. Hence, when a color included in a first color gamut is input, and the input color is converted into the color of a second color gamut narrower than the first color gamut, color conversion is made using a three-dimensional lookup table having red defined by $L^* \approx 45$ to 50, $a^* \approx 67$ to 70, and $b^* \approx 50$ to 55.

2 Claims, 5 Drawing Sheets

U.S. PATENT DOCUMENTS

| | | | |
|---|---|---|---|
| 2003/0234947 A1 | 12/2003 | Tsuchiya | 358/1.9 |
| 2004/0041898 A1* | 3/2004 | Nakamura | 347/172 |

FOREIGN PATENT DOCUMENTS

| | | | |
|---|---|---|---|
| JP | 11-41477 | | 2/1999 |
| JP | 11-177835 | | 7/1999 |
| JP | 2003-324620 | | 11/2003 |
| JP | 2004-104604 | * | 2/2004 |
| JP | 2004-104604 | | 4/2004 |

* cited by examiner

COLOR PROCESSING APPARATUS AND ITS METHOD, PROGRAM, AND PRINTER DRIVER

FIELD OF THE INVENTION

The present invention relates to a color processing apparatus and its method and, more particularly, to color processing for converting colors included within a broad color gamut into those in a narrow color gamut.

BACKGROUND OF THE INVENTION

There is a gamut mapping technique that represents a color, which exists in a color space (e.g., an RGB color space of a digital camera) with a broad color gamut but does not exist in a color space (e.g., a CMYK color space of a printer) with a narrow color gamut, in the color space with the narrow color gamut. The general gamut mapping attains the above color representation by selecting a region where it seems like an identical color (e.g., by selecting an equal hue line, selecting a region where it seems like an identical color, and so forth), as disclosed in, e.g., Japanese Patent Laid-Open No. 2004-104604.

The color of red is reproduced by a combination of color recording materials of magenta and yellow. The color of magenta using the color recording material of magenta has characteristics $L^* \approx 45$, $a^* \approx 82$, and $b^* \approx 2$ on an $L^*a^*b^*$ color space. The color of yellow using the color recording material of yellow has characteristics $L^* \approx 88$, $a^* \approx 4$, and $b^* \approx 105$ on the $L^*a^*b^*$ color space. The color of red is reproduced using these two color recording materials.

However, new ink as a color recording material of magenta is developed (to be referred to as "new magenta ink" hereinafter), and the color of magenta using the new magenta ink has characteristics $L^* \approx 41$, $a^* \approx 82$, and $b^* \approx 24$ on the $L^*a^*b^*$ color space. Therefore, the differences from the conventional magenta ink (to be referred to as "old magenta ink" hereinafter) are $\Delta L^* \approx 4$, $\Delta a^* \approx 0$, and $\Delta b^* \approx 26$, i.e., the lightness value is low, and b* assumes a very small value.

Note that new ink as a color recording material of yellow is also developed (to be referred to as "new yellow ink" hereinafter), and its characteristics (color) are nearly the same as those of the conventional yellow ink (to be referred to as "old yellow ink" hereinafter).

When the color of red is reproduced using the new magenta ink and new yellow ink with these characteristics, its lightness and saturation values are low, and subdued red is reproduced, i.e., a visually favorable color cannot be obtained. Hence, how to reproduce the visually favorable color of red is a question. As described in Japanese Patent Laid-Open No. 2004-104604 above, if an equal hue line is used, a close visual hue value can be selected on the color space with the narrow color gamut, but a saturation value often becomes low. In this case, a color with a subdued, light impression is obtained. If this is used in the reproduction of a photo or the like, a color that creates an impression different from that in the original photo is reproduced.

Furthermore, no problem is experienced when an allowable range of an identical color exists. However, when the color gamut is different beyond the allowable range, no measure can be taken.

SUMMARY OF THE INVENTION

The first aspect of the present invention discloses a technique that defines a color of red, which is to be reproduced in a second color gamut, by $L^* \approx 45$ to $50$, $a^* \approx 67$ to $70$, and $b^* \approx 50$ to $55$, when a color included on a first color gamut is converted into a color on a second color gamut narrower than the first color gamut.

Further, the second aspect of the present invention discloses a technique that converts image data on a predetermined color space into image data corresponding to a color which has a high saturation value although a hue value thereof is changed, of those which are reproducible within a color space of a color recording material, upon converting image data on the predetermined color space into that on the color space of the color recording material, when memory color is represented.

According to the present invention, a visually favorable color can be reproduced.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will be described in detail hereinafter with reference to the accompanying drawings.

[Structure of Printing Apparatus]

Figure 1:
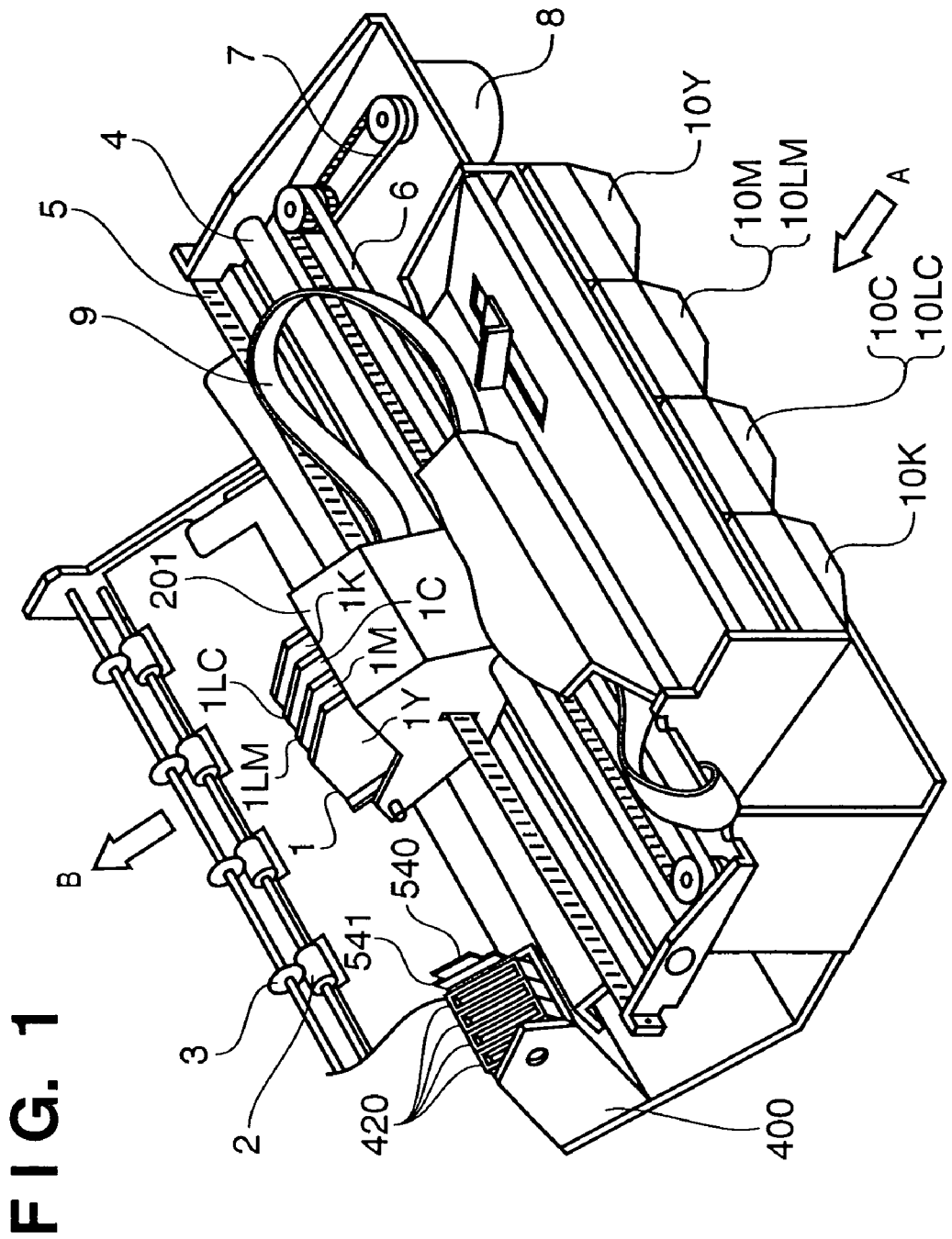
FIG. 1 is a view showing the structure of a printing apparatus.

FIG. 1 shows the structure of a printing apparatus (ink-jet color printer).

The printing apparatus shown in FIG. 1 is a device that prints an image by forming dots on a printing medium by ejecting ink droplets from nozzles of a print head 1 having a plurality of nozzle arrays. On the print head 1, a plurality of different print head arrays 1Y (for yellow ink), 1M (for magenta ink), 1C (for cyan ink), 1K (for black ink), 1LM (for light magenta ink), and 1LC (for light cyan ink) are arranged. Each print head array ejects color ink different from each other. A color image is formed on a printing medium by mixing of different colors of these ink droplets. Print data is supplied from a controller (to be described later) of the printing apparatus to the print head 1 via a cable 9.

In this manner, the printing apparatus of this embodiment adopts an arrangement having inks of six colors. Furthermore, the printing apparatus may adopt an arrangement having inks of seven colors including yellow ink and light yellow ink (LY).

For example, the cyan ink and light cyan ink are those of similar colors, and have different color recording material densities. The color recording material density of the cyan ink is higher than that of the light cyan ink. Note that a dye or pigment is often used as the color recording material. The differences between dark and light inks are not only the color recording material densities but also the color recording materials themselves often include different materials. Also, the dark and light inks may often have different solvent compositions in the inks, but they are still inks of similar colors.

The print head 1 shown in FIG. 1 is generally called a lateral alignment system, and print head arrays corresponding to a plurality of colors of inks are aligned in the main scan direction of a carriage 201 which mounts the print head 1. In addition to the lateral alignment system, a case wherein print head arrays that eject a plurality of colors of inks are aligned in a direction perpendicular to the main scan direction of the carriage 201, i.e., in the convey direction of the printing medium is called a lengthwise alignment system. Since the plurality of ink colors can be aligned within a space smaller than the lateral alignment system, the lengthwise alignment system is advantageous to attain a size reduction of the printing apparatus. Since the dot formation order of respective color inks remains the same even in a two-directional printing mode, color heterogeneity in the two-directional printing mode are smaller than the lateral alignment system.

The scan speed and position (print position) of the carriage 201 which mounts the print head 1 are detected by a speed detector 5, and the controller of the printing apparatus performs movement control of the carriage 201 in the main scan direction on the basis of this detection result. A power source that moves the carriage 201 is a carriage drive motor 8, and the rotation of the carriage drive motor 8 is transmitted to the carriage 201 via belts 7 and 6, thus moving the carriage 201 along a slide shaft 4. Note that a print operation is performed during scanning of the carriage 201.

A recovery unit 400 has a function of always keeping the print head 1 in a good condition, and a cap array 420 of the recovery unit 400 closes an ink ejection face of the print head 1 in a non-print state, thus preventing drying and the like. Note that a position where the carriage 201 and recovery unit 400 oppose is called a home position (HP).

The function of the recovery unit 400 during the print operation will be described below.

In an actual print operation, not all nozzles in one print head away are always used. Also, even when a plurality of colors of print head arrays are available, some print head arrays do not receive any print data, i.e., they are not used. When a given print head away does not eject any ink for a predetermined period of time while it is not capped, the surface of the print head away dries, and the ejection performance of ink drops due to adhesion of the color recording material, leading to deterioration in the quality of an output image. In order to prevent this phenomenon, nozzles in each print head array are controlled to eject ink at given time intervals in addition to the print operation, thus always keeping the surface of the print head array in an optimal condition. This operation is called preliminary ejection. The ink ejected by preliminary ejection is directed toward the cap away 420 in the recovery unit 400 so as to prevent contamination caused when it is scattered onto a printing medium or into the printing apparatus, and is sucked by a recovery pump (not shown) and is stored in a waste ink tank. Therefore, when preliminary ejection is made during the print operation, the carriage 201 must be returned to the HP to oppose the cap away 420 in both the one- and two-directional printing modes.

A sheet of printing medium is fed in the sub-scan direction by a paper feed member (rubber rollers and the like) driven by a paper feed motor 305 (to be described later). The printing medium fed from direction of arrow A shown in FIG. 1 reaches the printing position, and undergoes a print operation by the print head 1. After that, the printing medium is ejected or discharged from the apparatus in the direction of arrow B by paper discharge mechanisms 2 and 3.

Also, inks are supplied from ink cartridges 10K, 10C, 10LC, 10M, 10LM, and 10Y to the print head 1 for respective colors. Note that in this embodiment, the dark and light cyan inks and dark and light magenta inks are respectively stored in identical cartridges.

[Control Arrangement of Printing Apparatus]

Figure 2:
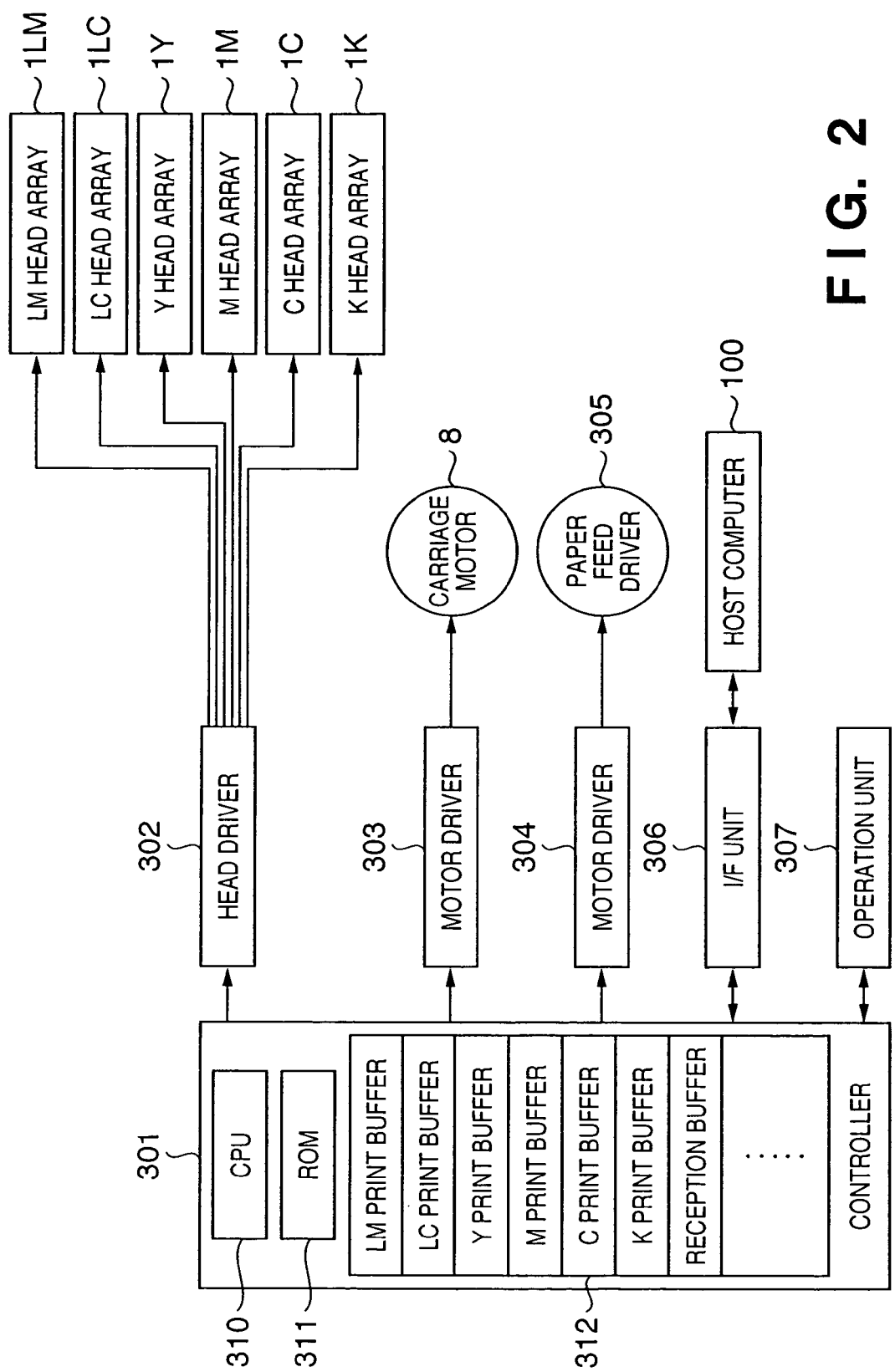
FIG. 2 is a block diagram showing the control arrangement of the printing apparatus.

FIG. 2 is a block diagram showing the control arrangement of the printing apparatus.

A controller 301 comprises a CPU 310 such as a microprocessor or the like, a ROM 311 which stores a control program to be executed by the CPU 310, a color processing program (to be described later), and various data, a RAM 312 which is used as a work area when the CPU 310 executes various kinds of processing, and temporarily holds various data, and the like. The controller 301 controls the operation of the entire printing apparatus. The RAM 312 is assigned a reception buffer which temporarily stores print data input from a host computer 100 via an interface (I/F) 306, and print buffers which temporarily store print data in correspondence with the print head arrays of the respective color inks.

A head driver 302 drives the print head arrays of the respective color inks in accordance with print data of respective colors output from the controller 301. Also, a motor driver 303 drives the carriage drive motor 8 and a motor driver 304 drives the paper feed motor 305 under the control of the controller 301.

An operation unit 307 comprises various keys operated by the user to set the operation of the printing apparatus, and a display for displaying the operation state of the printing apparatus and the like by the controller 301.

[Color Processing]

Figure 3:
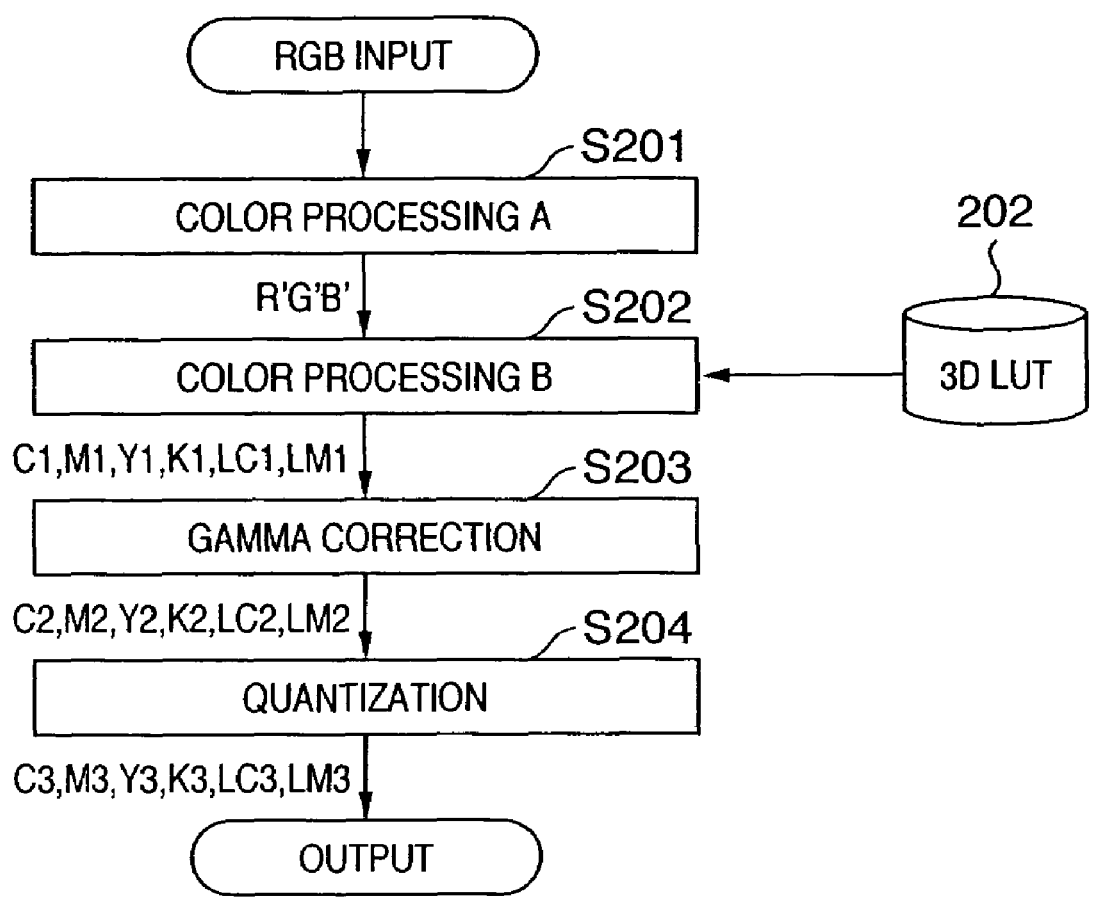
FIG. 3 is a flowchart showing the image signal processing (color processing) for printing.

FIG. 3 is a flowchart showing the image signal processing (color processing) for printing. Note that the printing apparatus may execute some or all steps of the color processing shown in FIG. 3, or the host computer 100 may execute these steps and may transmit the result to the printing apparatus. In this embodiment, either of these cases may be used.

RGB original image signals obtained by an image input device such as a digital camera, scanner, or the like, or computer processing or the like are converted into R'G'B' signals by color processing A (S201). The color processing A converts original image signals RGB into image signals R'G'B' corresponding to the color gamut of the printing apparatus.

The R'G'B' signals are converted into signals corresponding to the respective color inks by color processing B (S202). Since the printing apparatus of this embodiment has a six-color arrangement, the converted signals are density signals C1, M1, Y1, K1, LC1, and LM1 corresponding to cyan, magenta, yellow, black, light cyan, and light magenta. Practical color processing B uses a three-dimensional lookup table (3DLUT) 202 which receives R, G, and B inputs and generates C, M, Y, K, LC, and LM outputs, and as for an input value which deviates from a grid point, its output value is calculated based on those of surrounding grid points by interpolation.

Next, the density signals C1, M1, Y1, K1, LC1, and LM1 undergo gamma correction using a gamma correction table (S203). Next, gamma-corrected density signals C2, M2, Y2, K2, LC2, and LM2 are binarized by quantization (S204), thus obtaining image signals C3, M3, Y3, K3, LC3, and LM3 to be transferred to the print head arrays 1C, 1M, 1Y, 1K, 1LC, and 1LM. Note that the quantization (binarization) method adopts an error diffusion or dither method. The dither method binarizes using a predetermined dither pattern which has different thresholds for density signals of respective pixels.

[Comparison of Color Gamuts]

Figure 4:
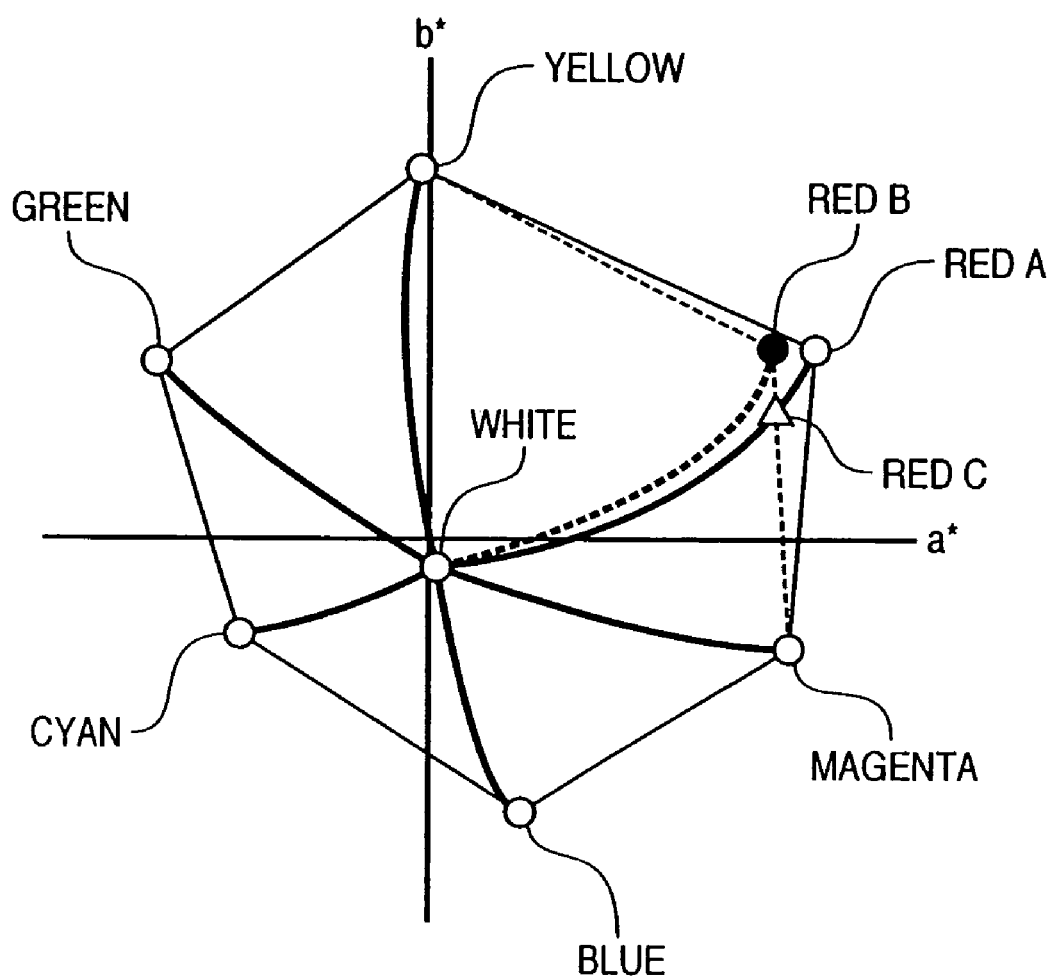
FIG. 4 shows the color gamut of a uniform color space by an $a^*b^*$ plane.

FIG. 4 shows the color gamut of a uniform color space (L*a*b* color space) by an a*b* plane.

Referring to FIG. 4, bold solid lines are hue lines which indicate changes in color from white indicated by a symbol ○ to primary colors (cyan, magenta, and yellow) and secondary colors (red A, blue, and green) similarly indicated by symbols ○. Also, thin solid lines which connect the six colors of the primary and secondary colors in the hue order indicate boundaries of a color gamut when old magenta ink is used.

On the other hand, a bold broken line is a hue line indicating a change in color from white to red B indicated by a symbol ● when new magenta ink is used. Also, thin broken lines that connect yellow, red B, and magenta indicate boundaries of a color gamut when the new magenta ink is used. As shown in FIG. 4, the color gamut when the new magenta ink is used (to be referred to as "color gamut B" hereinafter) is narrower than the color gamut when the old magenta ink is used (to be referred to as "color gamut A" hereinafter).

In this connection, as a method of reproducing the color of red using the aforementioned hue lines, an intersection of the thin broken line that connects red B and magenta and the bold solid line that connects white and red A is defined as red (red C indicated by a symbol ?). Since red C defined by this method can realize a maximum saturation value within the color gamut B, and is located on the hue line of red, it is suited as a hue value. However, the saturation value of red C is lower than that of red B, red C becomes visually subdued red, and it can hardly be favorable color reproduction. Depending on conditions, the lightness value of red C becomes higher than that of red B, and red C often becomes a lighter, subdued color in cooperation with the saturation drop.

Figure 5:
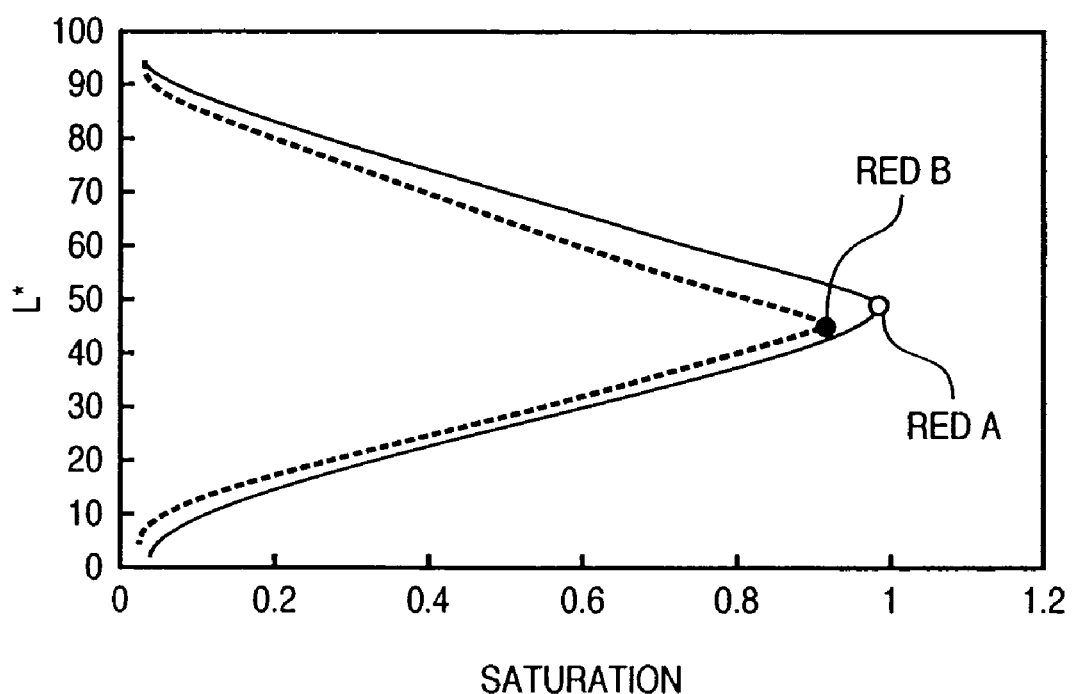
FIG. 5 is a graph showing changes in color from white to reds A and B, and then to black while the ordinate plots lightness L* and the abscissa plots saturation.

FIG. 5 shows changes in color from white to reds A and B and to black while the ordinate plots a lightness value L* and the abscissa plots a saturation (chroma) value. Since the saturation is a distance from an origin on the a*b* plane, a saturation value c of a color (a1*, b1*) on the a*b* plane is given by:

$$c = (a1^{*2} + b1^{*2})^{0.5} \quad (1)$$

In FIG. 5, a solid line indicates changes in color from white to red A, and then to black when the old magenta ink is used, and a broken line indicates changes in color from white to red B, and then to black when the new magenta ink is used. In the characteristics indicated by the solid line, a saturation value rises and reaches a maximum saturation value L*≈49, while a lightness value lowers from the neighborhood of L*=95, and after that, the lightness and saturation values lower and then reach black. On the other hand, in the characteristics indicated by the broken line, a saturation value rises and reaches a maximum saturation value L*≈45, while a lightness value lowers from the neighborhood of L*=95, and after that, the lightness and saturation values lower and then reach black. As shown in FIG. 5, when the new magenta ink is used, the lightness—saturation characteristics also have a narrow range in a red region.

[Color Conversion Method of Red Region]

As can be understood from the above description, when the new magenta ink is used, its color gamut B is narrower in the red region than the color gamut A when the old magenta ink is used, and the lightness—saturation characteristics also have a narrow range in the red region.

When such new magenta ink is used, red B is reproduced by setting the hue value of red to be closer to yellow (i.e., using the hue line from white to red B in FIG. 4) so as to utilize the maximum saturation of the color gamut B shown in FIG. 4. Note that red B whose hue value is closer to yellow appears yellowish compared to red A. Normally, since yellow has a higher lightness value than red, red B has a higher lightness value than red C obtained by maintaining the hue value from white to red A, and it appears lighter.

That is, reds A and B are visually, apparently different colors. However, red B is visually favorable red rather than red C which maintains the hue value from white to red A and has lower saturation and lightness values. Therefore, when reproduction of so-called memory colors is important like in a photo image, not only the color accuracy but also colors with favorable impressions are important. Hence, it is preferable to adopt red B rather than red C in which only the hue and lightness values are simply adjusted.

Therefore, when a table for representing a red region of the 3DLUT 201 used in the color processing A shown in FIG. 3 is created on the basis of the hue line that connects white and red B, the color processing A which reproduces red B can be implemented.

Practical numerical value ranges of red B can be defined on the uniform color space L*a*b* as:

$$L^* \approx 45 \text{ to } 50, a^* \approx 67 \text{ to } 70, b^* \approx 50 \text{ to } 55$$

When L* is smaller than the above range, it is inappropriate since the reproduced color becomes visually dark and its impression impairs. Conversely, when L* is larger than the above range, such case does not correspond to this embodiment since the color gamut is narrow and such value does not exist.

When a* is smaller than the above range, it is inappropriate since further saturation and lightness drops may occur. Conversely, when a* is smaller than the above range, it is inappropriate since the reproduced color becomes too yellowish.

When b* is larger than the above range, it is inappropriate since the reproduced color becomes too yellowish. Conversely, when b* is smaller than the above range, the reproduced color becomes light since the saturation value lowers and the lightness value rises, and hence, it is inappropriate.

Note that the central values of red B in this embodiment are:

$$L^* = 46, a^* = 69, b^* = 52$$

In this connection, in the following values of red A, since a* is as large as 74 but L* up to 49 is output, naturally appropriate red is reproduced:

$$L^* \approx 49, a^* \approx 74, b^* \approx 50$$

A color difference ΔE between the aforementioned values of red A and the central values of red B is given by:

$$\Delta E = \{(49-46)^2 + (69-74)^2 + (50-52)^2\}^{0.5} = 6.2 \quad (2)$$

The value of ΔE at which different colors are visually recognized falls within the range from 2 to 3. Therefore, reds A and B which have the color difference ΔE=6.2 are sufficiently recognized as different colors. Note that the above L*a*b* values were measured using Spectrolinom available from GretagMacbeth AG. The colorimetric conditions at that time are as follows:

Light source: D50

Field angle: 2°

White reference: absolute (correction by a white reference plate)

Filter: none

The aforementioned values of red are expressed on the L*a*b* space, but the same applies to those which are converted into other color spaces.

According to this embodiment, determination of color in the red region, when a color which does not exist within a printable color gamut into a color gamut that can print using the new magenta ink, utilizes the hue line of red which deviates from that of red which can be reproduced by the old magenta ink to the side of yellow, and can be reproduced by the new magenta ink. As a result, the color in the red region which is preferred upon reproducing a photo image can be reproduced although they are not colorimetrically, visually identical colors.

[Application to Printing Apparatus]

In order to implement color conversion in consideration of color reproduction of the new magenta ink, the 3DLUT 201 for the color processing A need only be stored in the ROM 311 of the printing apparatus. Upon executing the color processing B by the host computer 100, a printer driver having the 3DLUT 201 for the color processing A need only be installed in the host computer 100.

When a mode that attaches an importance on reproduction of memory colors is designated on a user interface provided by the printer driver, the above color conversion that attaches an importance on the saturation (and lightness) may be implemented. When the printer driver (printer controller) has a function of automatically determining which of photo, text, and graphics an object of an input image corresponds to, the above color conversion that attaches an importance on the saturation (and lightness) may be applied to image data corresponding to a photo image region that attaches an importance on reproduction of memory colors.

In the printing apparatus, when the old and new magenta inks are likely to be used together, three-dimensional lookup tables for the color processing A which support both the inks are stored in the ROM 311, and the three-dimensional lookup table used in the color processing A is switched upon operation of the operation unit 307. Furthermore, when the new magenta ink is used in a printing apparatus released before the advent of the new magenta ink, for example, a three-dimensional lookup table for the new magenta ink may be downloaded from the host computer 100 to the RAM 312 and may be applied to the color processing A.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-271011 filed on Sep. 17, 2004, which is hereby incorporated by reference herein.

What is claimed is:

1. A color processing method comprising using a processor to perform the step of converting color data, which is not included in a color reproduction range reproducible by using color recording materials, into color data included in the color reproduction range, wherein in the converting step, when memory color is reproduced, color data of red, which is not included in the color reproduction range, is converted into color data included in the color reproduction range, and wherein the converted color data corresponds to a color which has maximum saturation in a red region of the color reproduction range, and is defined by $L^* \approx 45$ to 50, $a^* \approx 67$ to 70, and $b^* \approx 50$ to 55, and a hue of the converted color data is different from that of the color data of red.

2. A printer driver executed in a computer for convening color data, which is not included in a color reproduction range reproducible by using color recording materials, into color data included in color reproduction range, wherein in the conversion, when memory color is reproduced, color data of red, which is not included in the color reproduction range, is converted into color data included in the color reproduction range, and wherein the converted color data corresponds to a color which has maximum saturation in a red region of the color reproduction range, and is defined by $L^* \approx 45$ to 50, $a^* \approx 67$ to 70, and $b^* \approx 50$ to 55, and a hue of the converted color data is different from that of the color data of red.

* * * * *